United States Patent [19]

Travaille et al.

[11] Patent Number: 6,067,107
[45] Date of Patent: May 23, 2000

[54] RESPONSE CAPACITY MANAGEMENT IN INTERACTIVE BROADCAST SYSTEMS BY PERIODIC RECONFIGURATION OF RESPONSE PRIORITIES

[75] Inventors: Timothy V. Travaille, Bellevue, Wash.; David W. Brubeck, Alameda, Calif.

[73] Assignee: Wink Communications, Inc., Alameda, Calif.

[21] Appl. No.: 09/070,757

[22] Filed: Apr. 30, 1998

[51] Int. Cl.[7] ........................................ H04N 7/10
[52] U.S. Cl. ................................... 348/1; 348/7
[58] Field of Search .............................. 348/1, 7, 13, 12, 348/10; 395/200.49; 455/2, 3.1; 711/151, 158; 345/327, 328

[56] References Cited

U.S. PATENT DOCUMENTS

| | | | |
|---|---|---|---|
| 5,251,324 | 10/1993 | McMullan, Jr. | 348/1 |
| 5,721,583 | 2/1998 | Harada et al. | 348/1 |
| 5,734,853 | 3/1998 | Hendricks et al. | 395/352 |
| 5,798,785 | 8/1998 | Hendricks et al. | 348/1 |
| 5,875,475 | 2/1999 | Kizu et al. | 348/7 |
| 5,905,847 | 5/1999 | Kobayashi et al. | 348/7 |

*Primary Examiner*—Victor R. Kostak
*Attorney, Agent, or Firm*—Fenwick & West LLP

[57] ABSTRACT

A system and method allow for the periodic re-configuring of broadcast receivers to control their storage of responses to interactive applications during a polling period. A broadcast server maintains a database of interactive applications each preferably associated with a program that will be broadcast. When the program is broadcast, an interactive application is inserted into the broadcast feed and delivered to a broadcast receiver such as a television set-top box. The broadcast receiver includes a processor, memory, and other hardware necessary to execute the interactive application. When executed, the interactive application generates a response which is transmitted to a local data center at, for example, the cable head-end. Generated responses have specific types. To manage the number and capacity of the system to receive responses, priority values are assigned to responses of different types. The priority values are based on the value of the responses to the provider of the interactive application, and established with respect to total response capacity, and an estimated response volume during a polling period. These priority values are assigned or updated preferably once each polling period, and transmitted to and stored in the broadcast receivers. Each broadcast receiver uses the priority value assignments to determine if it will execute and store responses for a currently received interactive application, or reserve memory capacity for higher priority responses.

42 Claims, 6 Drawing Sheets

400 POLLING PERIOD: Tuesday, March 3, 1998

| Time / Channel | 12am | 1am | 2am | 3am | 4am | 5am | 6am | 7am | 8am | 9am | 10am | 11am | 12pm | ... | 6pm | 7pm | 8pm | 9pm | 10pm | 11pm |
|---|---|---|---|---|---|---|---|---|---|---|---|---|---|---|---|---|---|---|---|---|
| Ch. 1 | | | | | | | | | | | | | | | | | | | | |
| Ch. 2 | | | | | | | | | | | | | | | | | | | | |
| Ch. 3 | | | | | | | | | | | | | | | | | | | | |
| ... | | | | | | | | | | | | | | | | | | | | |
| Ch. N | | | | | | | | | | | | | | | | | | | | |

404  402

| | |
|---|---|
| Program | Shopping Channel |
| Program Share | 86% |
| App. Type | Purchase |
| App. Share | 50% |
| Req. Sample | 100% |
| Estimated Res. | 43% |

406
408
410
412
414
416

| | |
|---|---|
| Program | Populist News Hour |
| Program Share | 15% |
| App. Type | Game |
| App. Share | 95% |
| Req. Sample | 75% |
| Estimated Res. | 10.6% |

RESPONSE CAPACITY MANAGEMENT IN INTERACTIVE BROADCAST SYSTEMS BY PERIODIC RECONFIGURATION OF RESPONSE PRIORITIES

CROSS REFERENCE TO RELATED APPLICATIONS

The subject matter of this application is related to the subject matter of U.S. Pat. No. 5,689,799, entitled "METHOD AND APPARATUS FOR ROUTING CONFIDENTIAL INFORMATION", which issued on Nov. 18, 1997, and U.S. Pat. No. 5,848,352, entitled "COMPACT GRAPHICAL INTERACTIVE INFORMATION SYSTEM", which issued on Dec. 8, 1998, and the following applications: application Ser. No. 08/942,705, entitled "METHOD AND APPARATUS FOR DETERMINING BROADCASTER INFORMATION", filed on Oct. 1, 1997, and application Ser. No. 09/071,003, entitled "CONFIGURABLE MONITORING OF PROGRAM VIEWERSHIP AND USAGE OF INTERACTIVE APPLICATIONS", filed on even date herewith. The above patent and applications have the same assignee as the present invention and are incorporated herein by reference in their entirety.

BACKGROUND

1. Field of Invention

The present invention relates generally to interactive broadcast systems, such as interactive cable systems, and more particularly, to systems an methods to manage the response capacity of an interactive broadcast system.

2. Background of the Invention

Interactive broadcast systems generally provide the viewer with various levels of interactivity associated with broadcast programs. This interactivity may include purchasing items advertised or sold during broadcast programs, registering the viewer with a service provided by a cable or broadcast operator, requesting additional information to be transmitted to the viewer, and the like. To provide these types of interactivity, the interactive broadcast system includes some mechanism for receiving responses created by viewers at their broadcast receivers. Conventionally, these responses are either stored in the broadcast receiver, and uploaded to the cable head-end on a polling scheduling, or are directly provided back to the cable head-end by a backchannel, such as a telephone line connection.

Systems of the former type are currently the most prevalent ones in use. In these systems, the broadcast receiver stores the viewer responses in a local memory. The cable head-end polls each of the broadcast receivers in the system, typically once each day late in the evening, and reads the stored responses from the local memory.

The total amount of response data that can be accumulated in this fashion is limited by several constraints. The communications network that couples the cable head-end to the broadcast receivers has a fixed bandwidth, which will vary in each cable system. This bandwidth, combined with a maximum amount of time allowed to conduct the polling each night (e.g., 1–2 hours), determines the total amount of response data that can be collected each night. The total number of responses may then be estimated by dividing the total amount of response data by the average amount of data per response. If more than the maximum number of response or data is stored in the broadcast receivers for uploading during a polling period, the excess responses are simply lost and not captured. Loss of responses is generally an unacceptable outcome, since those responses may be purchases or other important responses that both the viewer and the broadcaster (e.g., product advertiser) expect to be received.

A separate issue from the response capacity of the broadcast system is the amount of memory in each of the broadcast receivers. The installed base of broadcast receivers typically have between 100 and 1000 bytes of memory available to store responses. Conventionally, once a response is written it cannot be modified or removed until the broadcast receiver is polled. Thus, this very small amount of memory requires efficiency in how responses are structured. Even so, the typical response requires about 50 bytes, limiting these devices to between 2 an 20 responses per polling period. In addition, different responses often have different data requirements. Simple acknowledgments may require a very small amount of response data, while a purchase response may require significantly more data, such as a viewer's name, address and billing information. Typically, the broadcast receiver will attempt to store each response the viewer generates, but this may result in the loss or failure to capture responses beyond the memory capacity of the broadcast receiver. Conventional systems provide no mechanism for the broadcast receivers to dynamically reconfigure themselves to selectively or preferentially store different types of responses.

Accordingly, it is desirable to provide a system and method for managing the response capacity of an interactive broadcast system.

SUMMARY OF THE INVENTION

The present invention overcomes the limitations of conventional broadcast systems by providing for the periodic reconfiguration of the various broadcast receivers' ability to selectively store responses. The responses are preferably generated in response to interactive applications. The periodic reconfiguration adjusts priority values assigned to different types of responses. The adjusted priority values are transmitted to the various broadcast receivers in the broadcast system. Each broadcast receiver then dynamically determines whether or not to capture a particular type of response at a particular time based on available memory and the updated priority value of the response. Priority value assignments are re-determined periodically, preferably once each polling period, and reflect the value of the response to the provider of the interactive application that generates the response, the particular rating share of the broadcast program that accompanies the interactive application, and the rating of the interactive application itself.

The present invention may be embodied in a system that includes a broadcast server that makes the periodic readjustment of the priority values for the various response types, and in broadcast receivers that receive the priority value assignments from the broadcast server and use them to selectively determine for each interactive application whether or not to execute and capture responses for the interactive application.

Another embodiment of the present invention is a method of managing response capacity in an interactive broadcast system. An interactive application configured to receive a predetermined type of response is received, for example, at a broadcast receiver capable of executing the interactive application. A response priority value for the predetermined type of response is determined. From this a determination is made as to whether there is sufficient available memory capacity in the broadcast receiver to receive a response to the received interactive application an at least one response having a response type with a priority value higher than the response priority value of the predetermined type of response. If there is sufficient memory, the interactive application is permitted to be executed to receive a response, and stores any received response in the memory. Otherwise, the interactive application is not executed and does not store any responses.

Additionally, the method includes periodically receiving from a remote source a response priority table defining for each of a plurality of response data types a priority value, and storing the response priority table in a local memory of the broadcast receiver. In this fashion the priority assignments for different types of responses can be periodically adjusted to allow for optimized management of response capacity.

Another aspect of the present invention is the configuration of the distributed broadcast receivers. This aspect involves estimating a number of responses to be collected from the plurality of broadcast receivers during a selected polling period, wherein each response has a response type. From the estimated number of responses, a first proportion of the estimated number of responses that must be collected according to their response type is determined along with a second proportion that may be sampled. Then, for each response type in the first proportion a first response priority value is assigned, and for each response type in the second proportion a second response priority value is also assigned. The assignments are such that any first response priority value is higher than any second response priority value. This ensures that responses that must be captured are always given priority over responses that may be sampled. At least one sampling rate for response types included in the second proportion of responses is defined. Finally, the defined priority values are transmitted to the broadcast receivers for storage therein. This allows the distributed broadcast receivers to re-configure themselves to selectively capture responses.

DETAILED DESCRIPTION OF THE PREFERRED EMBODIMENT

Figure 1:
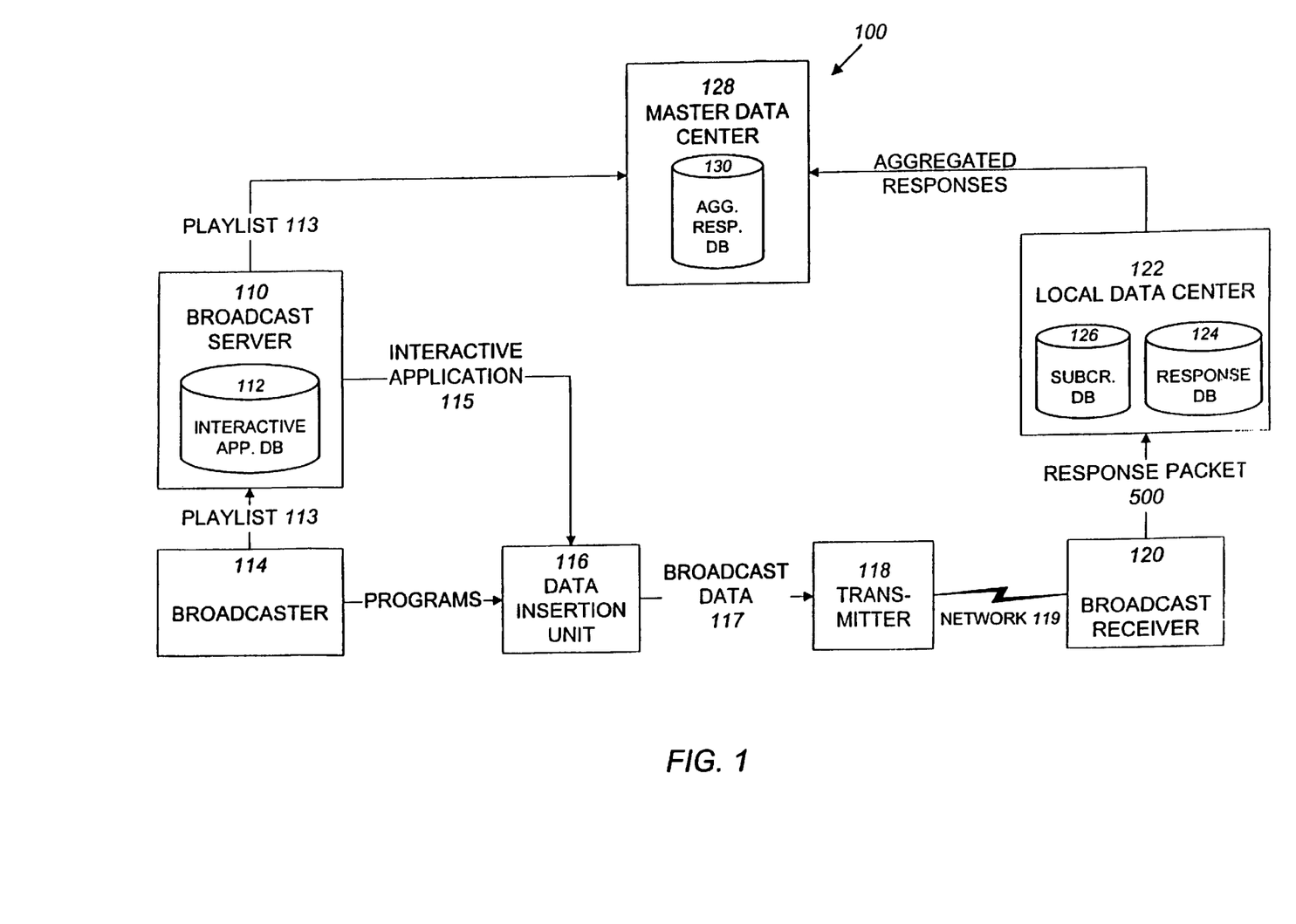
FIG. 1 is a high-level block diagram illustrating a system for managing response capacity according to a preferred embodiment of the present invention.

Referring now to FIG. 1, there is shown an illustration of a system in accordance with the present invention. It will be appreciated that the system illustrated in FIG. 1 may be incorporated into larger, more complex systems while still providing the features and benefits of the invention. Generally, system 100 includes a broadcaster 114, a broadcast server 110, a data insertion unit 116, and at least one broadcast receiver ("BR") 120.

The broadcaster 114 provides program material to be broadcast to the BRs 120. As used herein, a "broadcaster" 114 is any entity providing a program that will be carried on a broadcast signal. A "program" is a discrete segment of a broadcast. Thus, as defined herein, program includes television shows, commercials, public service announcements, pay-per-view events, and the like. Broadcasters include television networks, as well as advertisers who prepare commercials, pay-per-view providers, cable networks, and the like. A typical broadcaster 114 maintains program sources, such as banks of video cassette players, video disc players, film and the like containing program material; automation systems that selectively control the program sources to select which units provide program material at which times; and switching systems controlled by the automation systems which couple the program sources to respective broadcast mediums for controlling which program sources out put to which broadcast medium at any given time. The person or persons receiving the programs are referred to as "subscribers" or "viewers."

The broadcast server 110 is preferably a computer system executing a software program providing the functionality described herein. The broadcast server 110 contains an interactive application database 112. The interactive application database 112 stores interactive applications that will be broadcast to various remotely distributed BRs 120. Interactive applications may be added to the interactive applications database 112 by a broadcaster 114 or other program supplier and may be transmitted to the database 112 by a secure network link or other transmission media. Fields within the database 112 associate interactive applications with, for example, a particular broadcaster, network, channel, program, and/or broadcast time. In addition, each interactive application in the database 112 preferably has a unique interactive application identification code by which it may be identified.

In one embodiment of the present invention, the interactive applications stored in the database 112 are described by a compact communications protocol. The compact protocol is designed to broadcast a compact set of information and commands among the system components in an efficient manner, thereby allowing the use of low bandwidth transports such as the vertical blanking interval ("VBI"). A detailed description of one compact protocol for monitoring interactive applications, including supported definitions, scripts, and commands, is described in U.S. Pat. No. 5,689, 799, entitled "METHOD AND APPARATUS FOR ROUTING CONFIDENTIAL INFORMATION," which issued on Nov. 18, 1997 and is hereby incorporated by reference herein. While a preferred embodiment of the present invention uses the compact protocol described therein, interactive applications may be described by other protocols, including for example, the Hypertext Markup Language ("HTML") or SUN MICROSYSTEMS INC.'s JAVA language.

There may be a plurality of broadcast servers 110, with each broadcast server 110 serving a particular geographic area, set of broadcasters, or set of subscribers. In one embodiment, each broadcast server 110 is identified by a unique server identification code.

Generally, the broadcast server 110 determines which interactive applications should be broadcast on a particular channel at a particular time, retrieves the interactive applications corresponding to the particular channel and time from the database 112, and prepares the interactive applications for broadcast.

To determine which interactive applications are broadcast at the various times, channels, and so forth, the broadcast server 110 receives a playlist 113 of programs to be broadcast by the broadcaster 114. In one embodiment, this playlist 113 is prepared in advance and identifies the programs that will be broadcast by the broadcaster 114 at particular times. In another embodiment, the broadcast server 110 receives the playlist 113 in real-time, identifying the program currently being broadcast by the broadcaster 114, with the playlist 113 being updated as the broadcast changes. In either embodiment, the playlist 113 contains sufficient information to identify each program, its start and end times, the channel and network assignments, or broadcaster identification code. The broadcast server 110 uses this information to identify and retrieve a corresponding interactive application from the database 112 that is to accompany the program.

The broadcast server 110 formats a retrieved interactive application 115, if necessary, and otherwise prepares it for insertion into a broadcast signal. Using the playlist 113 received from the broadcaster 114, the broadcast server 110 passes the interactive application 115 to the data insertion unit ("DIU") 116 to incorporate the interactive application 115 into the broadcast feed concurrent with the broadcast of the program.

The DIU 116 receives the interactive application 115 from the broadcast server 114 and the broadcast signal, or feed, carrying the program corresponding to the interactive application 115. The broadcast feed may be received from the broadcaster 114, or, in the case where the broadcaster does not provide the feed, from a third party such as a network, cable operator, or local television station. The DIU 116 converts the interactive application 115 into a format suitable for insertion into the broadcast feed and transmission therewith as broadcast data 117. The DIU 116 may receive feeds from multiple broadcasters and can insert a separate interactive application 115 into each feed. Likewise, the DIU 116 can simultaneously insert a separate interactive application 115 into multiple channels from the same, or different, broadcasters 114.

The DIU 116 inserts the broadcast data 117 containing the interactive applications and broadcast programs into the broadcast medium. The broadcast medium is the frequency spectrum used to carry the interactive application 115. In one embodiment, the broadcast medium is a standard analog television signal following National Television Standards Committee ("NTSC") standards and the VBI is used as a transport to broadcast the interactive application 115. The transport is the specific portion of the broadcast medium which carries the interactive application 115.

In one embodiment, the DIU 116 uses conventional methods to insert data defining an interactive application 115 into the VBI of the broadcast feed. The North American Broadcast Teletext Standard (EIA-506), defines the methods and protocols for sending data in one or more lines of the VBI. However, a wide variety of other transport mechanisms are available, including those that broadcast the interactive application 115 separately from the broadcast program. Such transport mechanisms include out-of-band transmitters, which transmit the interactive application 115 on an unused portion of the television frequency spectrum, and conventional frequency modulation ("FM") radio transmitters, which transmit the interactive application 115 outside the television frequency spectrum. In another embodiment, the broadcast medium is a standard MPEG2 Digital Video Multiplex, containing one or more MPEG2 Video Services, and a MPEG2 elementary stream (or streams) within this multiplex is used as a transport. In another embodiment, the DIU uses conventional methods to insert data into an elementary stream within a MPEG2 multiplex.

In one embodiment, error checking or error correcting codes such as Hamming codes are inserted with the broadcast data 117. In one embodiment, the DIU 116 translates the data into a Hamming code, and in another embodiment, the data received by the DIU 116 from the broadcast server 114 is already encoded.

The DIU 116 is coupled to a transmitter 118 for transmitting the broadcast feed, including the inserted interactive application. In one embodiment, the transmitter 118 is a satellite uplink transmitting the feed to local uplink receivers which then distribute the feed to the BRs 120 via cable. In another embodiment, the transmitter 118 is a conventional cable system head-end amplifier. In yet other embodiments, the transmitter 118 is a conventional television broadcast transmitter or a high-definition television digital transmitter.

In another embodiment, the DIU 116 inserts the interactive application 115 into the program before the program is broadcast. For example, the DIU 116 may insert an interactive application into the source copy of a television commercial. Accordingly, the interactive application is broadcast whenever the commercial is broadcast. In this embodiment, the broadcast server 110 does not need to synchronize the retrieval of the interactive application with the schedule listed in the playlist.

Regardless of transmission method and insertion time, the broadcast data 117, including the interactive application, is received by a subscriber's BR 120. Although only a single BR 120 is illustrated in FIG. 1, it is understood that in a typical embodiment there are hundreds or thousands of BRs 120 receiving the broadcast data 117 and responding as described herein. In particular, each broadcast receiver 120 may individually set and establish reminders for broadcast and non-broadcast events as desired by their respective users. In a typical embodiment, the BR 120 is a television set-top box receiving the data 117 via a coaxial cable. Additionally, the BR 120 may be integrated into the television. Moreover, other broadcast receivers, including a NTSC broadcast receiver, a high-definition television digital receiver, a video cassette recorder, or a FM radio receiver can also be used.

Figure 2:
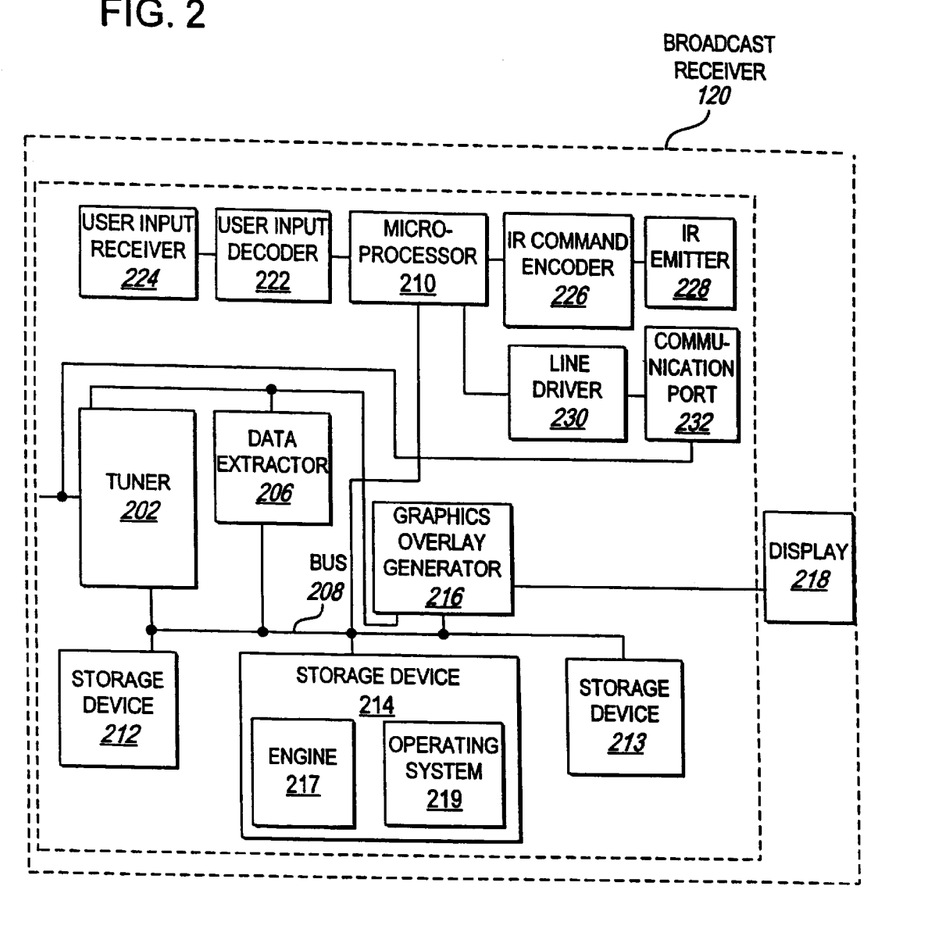
FIG. 2 is a block diagram illustrating an embodiment of a remote broadcast receiver according to an embodiment of the present invention.

FIG. 2 illustrates an embodiment of the BR 120 according to an embodiment of the present invention. In one embodiment, the BR 120 is the General Instrument CFT-2200 CATV set-top decoder. The BR 120 includes a tuner 202 for receiving the broadcast data 117 from the transmitter 118. In one embodiment, the tuner 202 is a conventional cable television tuner. In other embodiments, the tuner is a television broadcast tuner, a FM radio tuner, a digital tuner, or some other form of tuner. The embodiment illustrated in FIG. 2 shows a display 218, typically a television, within the BR 120. As mentioned above, the display 218 may also be located external to the BR 120.

The BR 120 also includes a data extractor 206 coupled to the tuner 202 for extracting the interactive application from the broadcast data 117. In one embodiment, the data extractor 206 is a conventional VBI inband data extraction circuit. In another embodiment, the data extractor 206 is a conventional modem. The data extractor 206 provides a serial bitstream containing the extracted interactive application onto a bus 208. The bus 208 is coupled to a microprocessor 210 which stores, via the bus 208, the extracted interactive application into a first storage device 212 as instructed by a program stored in a second storage device 214. In one embodiment, the microprocessor 210 uses the error code information from the extracted data to check or correct errors in the decoded interactive application. In one embodiment, the first storage device 212 is a conventional random access memory ("RAM") while the second storage device 214 is a conventional read-only memory ("ROM"). Other memory types, such as a flash memory which is readable and writeable yet retains its contents after a power loss, may be substituted for either storage device. An advantage of flash memory is that software or data resident in the BR 120 can be modified by a received interactive application 115. The first storage device 212 is preferably used to store responses generated by a viewer during use of an interactive application 115.

In one embodiment, the BR 120 also uses the data extractor 206 to extract a time signal from the broadcast data 117. The time signal indicates the current time using a standard timebase, such as Universal Coordinated Time ("UTC") or the subscriber's local time. In another embodiment, the BR 120 has a real-time clock that is either set by the subscriber or the received time signal. Regardless, the BR 120 preferably has access to the current time and, accordingly, can perform date stamping and timing functions.

As described below, the microprocessor 210 uses the program stored in the second storage device 214 and the interactive application stored in the first storage device 212 to execute the interactive application and provide an output. The program stored in the second storage device 214 is preferably an execution engine 217 for executing an interactive application defined by various scripts, forms, definitions, and code and graphic resources. A preferred execution engine is the Wink Engine provided by Wink Communications, Inc. of Alameda, Calif.

The output from executing an interactive application may be, for example, a form presenting information or a menu to a television viewer or for receiving viewer input, or it may be a response containing BR 120 or television usage data or indicating viewer preferences. To this end, the BR 120 preferably includes a graphics overlay generator 216 coupled to the bus 208 and driven by the interactive application 115 stored in the first storage device 212 and the program stored in the second storage device 214. The graphics overlay generator 216 generates a graphical display responsive to the interactive application 115. This graphical display is displayed on a display 218, typically a television, coupled to the BR 120. Of course, the graphics overlay generator 216 is typically not used when an interactive application silently executes.

In one embodiment, the graphics overlay generator 216 also receives the broadcast signal corresponding to a broadcast program from the tuner 202 to allow simultaneous display of the broadcast program and the graphical aspects, if any, of the interactive application 115, for example, to input data into a displayed form to set or cancel a reminder. In one embodiment, the microprocessor 210 is also coupled to a user input decoder 222 coupled to a user input receiver 224 to allow the user to communicate with the microprocessor 210 in order to respond to the interactive application 115. In one embodiment, the user input decoder 222 is a conventional infrared remote control decoder. The user input receiver 224 is preferably a conventional infrared receiver 224 with which the user may use a conventional hand-held remote control device. Remote control keys pressed by the user translate to coded infrared signals that are received by the user input receiver 224, are decoded by the user input decoder 222, and sent to the microprocessor 210 to allow the user to communicate with the interactive application 115.

In one embodiment, the BR 120 is a cable TV set-top decoder, connected to a cable system via a broadband coax cable. In this embodiment, line driver 230 is an RF modem which is capable of sending responses via the coax cable to the cable system head-end, typically using an out-of-band portion of the RF spectrum, and communications port 232 is a standard RF tap. In another embodiment, the BR 120 is a television, VCR, or set-top in which line driver 230 is a standard telephone modem and communications port 232 is a standard RJ-11 jack.

The microprocessor 210 may also be coupled to a conventional infrared command encoder 226, which accepts an infrared command input and encodes a signal for a conventional infrared emitter 228 to allow the interactive application 115 to control external devices.

Returning to FIG. 1, various interactive applications 115 are individually executed by a BR 120 as the viewer is viewing a broadcast program. An interactive application 115 may allow the viewer to respond to various displayed menus or forms. For example, a viewer may complete a purchase form to purchase an advertised item or complete a request form to request product information. Likewise, a viewer may make a response to a participant-based interaction, or complete a registration request to register for a product, a broadcast, or other service. A response may also be simply the usage of various forms or displays of an interactive application 115, without any necessary intention by the viewer to consciously respond to the interactive application 115.

These various types of responses are provided back to a local data center ("LDC") 122 for processing, typically after being stored in the first storage device 212 of the BR 120. In one embodiment, the BR 120 forwards responses to the LDC 122 at particular time intervals, in response to a poll from the LDC 122, an interactive application 115, or another device, or at a rate determined by the interactive application 115 that generated the response. Generally, the responses are collected by the LDC 122 once during each polling period. A typical polling period is 24 hours, and the responses are transmitted during a polling window at the end of the polling period. Because there may be thousands of BRs 120 in operation generating and forwarding responses, it is necessary to manage the number of responses that the BRs 120 can individually store and forward during the polling period so as to not overload network capacity coupling the BRs 120 to the LDC 122. The present invention provides a method and system by which the broadcast server 110 (or other entity) can periodically re-configure each of the BRs 120 to manage the number and types of responses that are stored in the BRs 120, so as to optimize the amount of responses are that captured and transmitted to the LDC 122 in a polling period.

Each BR 120 preferably has a unique terminal identification code that is included in the response and allows the LDC 122 to identify each responding BR 120. In addition, the BR 120 also preferably includes the interactive application 115 and broadcast server identification codes in the response.

The LDC 122 is preferably a computer system executing a software program providing the functionality described herein. The LDC 122 stores the responses in a response database 124. By using the terminal identification code, the LDC 122 can cross-reference responses in the response database 124 with subscriber information stored in a subscriber information database 126. The subscriber information database 126, in one embodiment, is the same database as is used for subscriber billing. In addition, the database preferably contains information about the subscribers useful for marketing purposes, such as the subscribers' household income, age, race, interests, preferences and the like. In an alternative embodiment, the additional marketing information is stored in a separate database accessible by the terminal identification code or other information contained in the subscriber information database 126. The data in the subscriber information database 126 are aggregated with the responses in the response database 124.

The aggregated data are preferably transmitted from the LDC 122 to a master data center ("MDC") 128. The MDC 128 is also preferably a computer system executing a software program providing the functionality described herein. The MDC 128 holds the aggregated responses in an aggregate response database 130. In addition, the MDC 128 preferably receives a playlist 113 from the broadcast server 110, the broadcaster 114, or another source, that allows it to correlate responses with broadcast programs.

Figure 3:
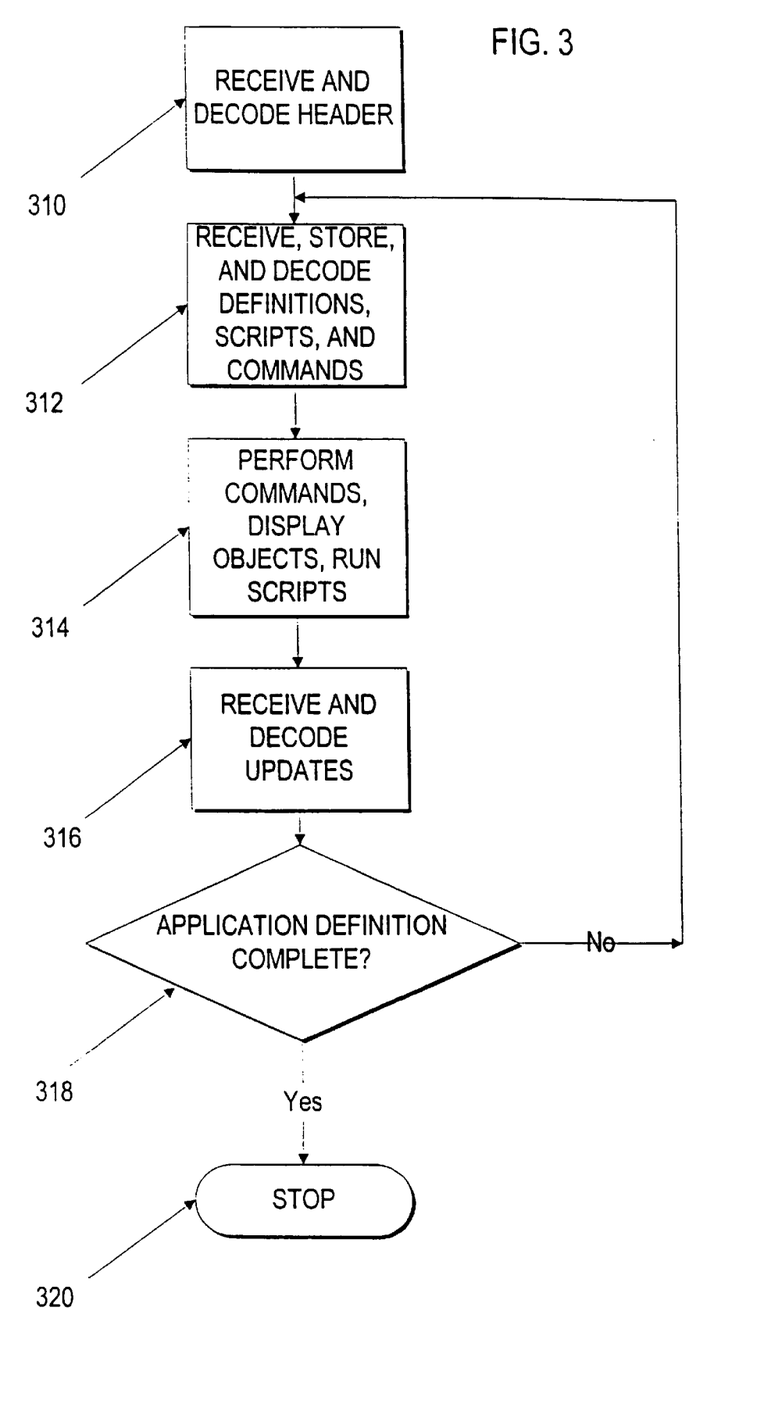
FIG. 3 is a flowchart illustrating steps for receiving and operating an interactive application according to an embodiment of the present invention.

FIG. 3 is a flow chart illustrating steps for receiving and operating an interactive application 115 using the compact information protocol according to a preferred embodiment of the present invention. The BR 120 receives and decodes 310 an application header record prepared by the broadcast server 110, inserted by the DIU 116, and transmitted by the transmitter 118. The application header record describes the information that follows and contains the interactive application identification code.

The functionality of the interactive application 115 is described by definitions, scripts, and commands which may be encoded and broadcast in any order. The definitions, scripts, and commands are received and decoded 312 by the BR 120 and define the types and forms of responses that may be received when executing 314 the interactive application 115. More particularly, each interactive application 115 that requires a response (or more than one response) includes data defining the type of response, and the particular data included in the response. In a preferred embodiment, there are five types of responses.

A registration response is a viewer input to register the BR 120 with the MDC 128 or the LDC 122 to enable the BR 120 to send other types of responses, and particularly for facilitating purchase responses. The data for a registration response preferably includes payment information, such as credit card type and credit card number, expiration date and PIN if applicable, and any other information necessary to identify the viewer or product or service being registered. If the viewer is already known to the LDC 122 or MDC 128, then viewer identification data identifying the viewer may be provided with a customer account number or the like. Alternatively, the viewer identification data may be supplied at the LDC 122 from the subscriber information database 126 by looking up viewer identification data that correlates with the terminal identification code of the viewer's BR 120. Registration in this manner reduces the amount of data that needs to be transmitted from the BR 120 to the LDC 122 in a purchase response, and also protects the privacy of the viewer's payment information, since the payment information does not have to be included in the purchase responses directly.

A purchase response is a viewer response to purchase an item or service which is promoted, offered, advertised, or otherwise made known to the viewer. For example, a purchase response may be used to purchase a premium channel service, or a specific pay-per-view broadcast. Alternatively, a purchase response may be used to purchase a product that is marketed on television show. The data for a purchase response will preferably identify the product or service being purchased, for example with a product number. Other purchase information, such as quantity, size, color, or the like may also be included. If necessary, viewer identification data and payment information may also be provided in the various manners described above. Purchase responses, and the means for protecting the confidentiality of viewer information are further described in the above referenced U.S. Pat. No. 5,689,799, entitled "METHOD AND APPARATUS FOR ROUTING CONFIDENTIAL INFORMATION".

A request response is a viewer response to request information about an item or service which is promoted, offered, advertised, or otherwise made known to the viewer. The data for a request response preferably includes data identifying the item or service for which information is desired, and may be similar to the purchase information in this regard. Payment information is not needed, though again viewer identification data may be included if necessary to identify the viewer.

A vote response is a viewer response to a participatory interactive application, such as a trivia quiz, a voting application, a game, or the like, and is generally used for miscellaneous responses where subscriber information is not required. The data for a vote response is application specific and dependent on the type of participant interaction. Simple applications will need only to include a response that encoded the vote itself, and viewer information and the like is not needed. More complex applications may encode text or other data of the viewer's response. For example, a more complex interactive application 115 may provide for up to ten multiple choice questions with up to five possible choices per question. A vote response would then identify the question by name or number, and the viewer's response by number.

A usage response is a response tracking the viewer's use of an interactive application 115, such as which forms of the interactive application 115 were visited and for how long, the order in which forms were visited, the number of times each form was visited, and the like. In addition, a usage response may be used to track usage of features of the BR 120 or other attached devices, such as a television set. For example, a usage response may be used to track changes in volume, mute, picture-in-picture, and other user-selectable features. This response may be created with or without the viewer's awareness, and is helpful to the provider of an interactive application 115 to measure the effectiveness of an interactive application 115.

Some or all of the received interactive application 115 may be stored 312 within the BR 120. In one embodiment, the interactive application 115 is repeatedly broadcast, allowing a BR 120 to tune to a program at any time yet receive the entire interactive application 115. Any desired updates to the stored interactive application 115 may be received and decoded 316. If there are additional or updated definitions, scripts, or commands, they may be sent until the application is complete 318. In one embodiment, a termination command may be broadcast to stop 320 the interactive application 115 from monitoring.

A new interactive application 115 may be sent at any time, including while an original application is transmitting a response. For example, a new interactive application 115 corresponding to a commercial may interrupt an original application corresponding to a news program, the latter application can resume operation upon termination of the former. As part of this functionality, in one embodiment a suspend application command is sent by the new application in order to suspend operation of the original application, and a resume application command may be sent by either application to terminate the new application and resume operation of the original application.

Figure 4:
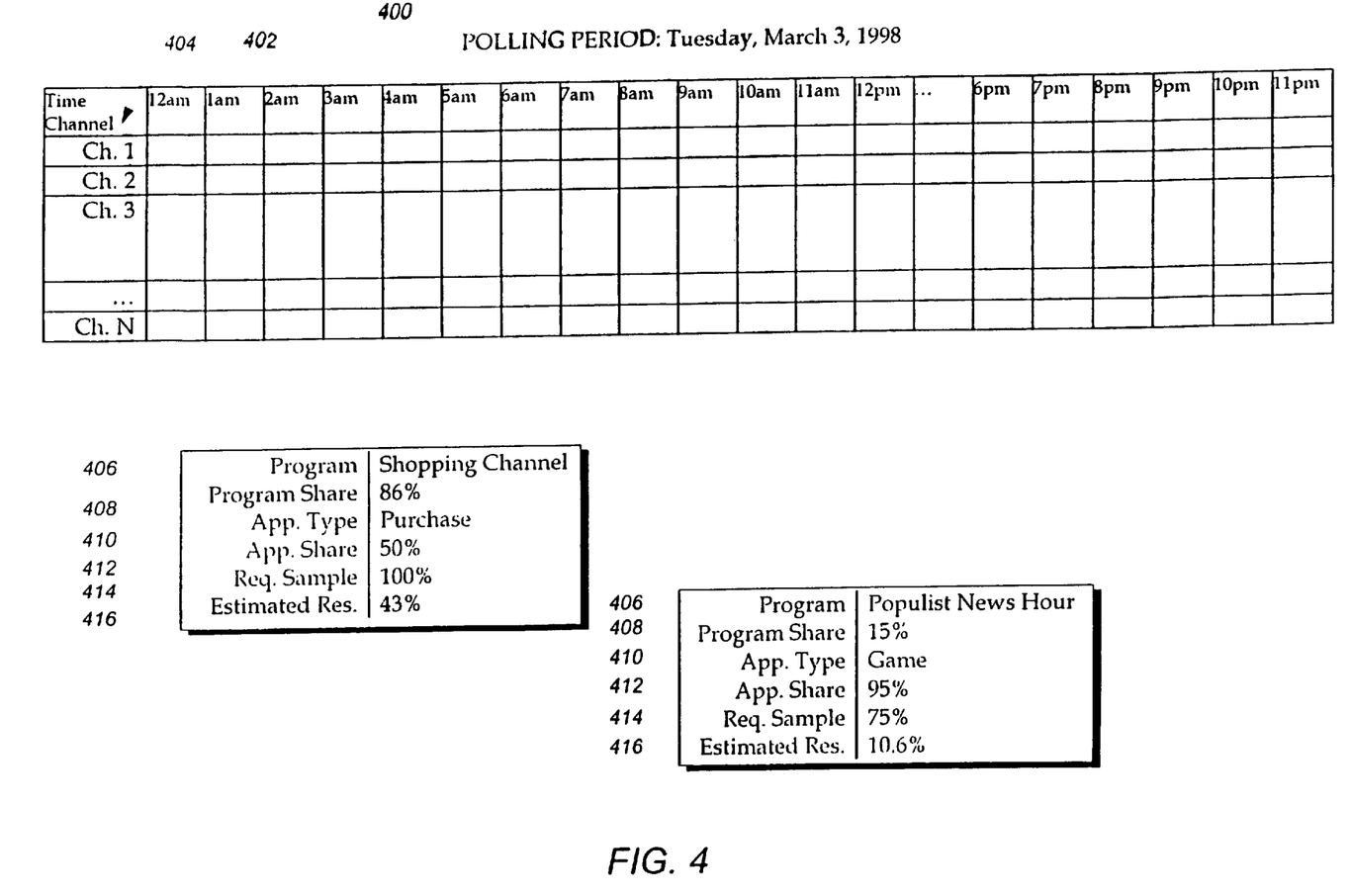
FIG. 4 is an illustration of the data analysis of a response schedule for a polling period.

Referring now to FIG. 4 there is an illustration of the data used to manage response capacity during a polling period. FIG. 4 illustrates an example of a single polling period 400, here Mar. 3, 1998. During the polling period 400 there are a number of time slots 402 (e.g. 2 a.m. as shown) during which programs and interactive applications 115 may be broadcast by a broadcaster 114. The time slots here are shown as 1 hour time slots, but shorter or longer time slots are commonly used. In each time slot there are a number N of different channels 404 on which the broadcast programs and interactive applications 115 may be aired. Accordingly, in each time slot/channel combination, there is a particular program 406 that is being aired. FIG. 4 illustrates two examples of such programs 406. The first is the "Shopping Channel" which will be broadcast at 6 a.m. on channel 2; the second is the "Populist News Hour," broadcast at 6 p.m. on channel 3.

Accompanying selected ones of the broadcast programs is an interactive application 115 which when executed generates responses, either automatically or in response to a viewer command. Each interactive application 115 has a type 410 which indicates the types of responses generated by the application. The interactive application 115 accompanying the Shopping Channel is a purchase type, and will generate purchase type responses which must be collected to ensure that the viewer's purchase of an item is fulfilled. The interactive application 115 accompanying the Populist News Hours is a voting application allowing the viewer to indicate a response to a news poll, for example, measuring the popularity of a politician. These responses are vote responses. As such, it is not necessary that every such response be collected, and sampling of responses may be desired. The issue facing the broadcaster 114 or other entity controlling transmission of the interactive applications is how to configure the BRs 120 that will be receiving these interactive applications during the polling period so as to optimize the amount of responses generated while ensuring that certain types of responses (e.g., purchases) are collected at 100% rate, and others, e.g., vote responses, are sampled at a sufficiently high rate so as to provide useful information to the entity providing the interactive application 115. This issue is addressed as follows.

Each broadcast program has a known program share 408, or viewer rating, indicating the percentage of households that are expected to view that program relative to all other households viewing during the time slot 402. Thus, the Shopping Channel has an 86% share in its time slot 402, whereas the Populist News Hour has a 15% share in its time slot 402. Program share 408 may be determined using conventional program rating systems, or by collecting viewership information using interactive applications themselves that monitor viewer behavior.

Separate from the program share 408, an interactive application 115 accompanying a program has it own application share 412. This is the percentage of viewers watching the accompanying broadcast program that are expected to use the interactive application 115. For example, 50% of viewers who are watching the Shopping Channel are expected to use the accompanying interactive application 115, whereas 95% of the viewers of the Populist News Hour are expected to use its interactive application 115. Application share 412 may be estimated by collecting and analyzing the responses that are generated by the interactive applications themselves.

Each interactive application 115 also has its own required sample rate 414, which is the percentage of responses to the application that should (in the view of the provider of the interactive application 115) be captured. For example, it is desirable that 100% of purchase responses be collected during the Shopping Channel, but it may be necessary to capture only 75% of the voting responses during the Populist News Hour.

It should be noted that mere usage of an interactive application does not necessarily mean that the viewer will generate a response (unless the response type is a usage response). Thus, each interactive application 115 also has its own estimated response rate 416. For example, while 50% viewers of the Shopping Channel use its accompanying interactive application 115, only 43% of such viewers actually make a purchase. Similarly, while 95% of viewers of the Populist News Hour initiate the accompanying interactive application 115, only 10.6% actually respond with a vote (which is here a vote response). The estimated response rate 416 is based on historical response data that is collected and analyzed.

These four factors, program share 408, application share 412, required sample 414, and estimated response rate 416 are used to periodically re-configure the BRs 120 to selectively store responses to interactive applications. The additional factors are the number of BRs 120 in the system, the bandwidth of the network coupling the BRs 120 to the LDC 122, the length of the polling window, the total memory capacity of the first storage device 212 where responses are stored prior to being transmitted to the LDC 122, and the average response size.

While FIG. 4 illustrates the above described data with respect to only two programs, it is important to understand that such data is available for and associated with each program in each time slot 402 on each channel 404 that has an accompanying interactive application. Thus, in a typical broadcast system with 50 channels, a 24 hour polling period with 48 half-hour time slots, there are 2400 such sets of data which describe the response characteristics that can be anticipated during the polling period.

Figure 5:
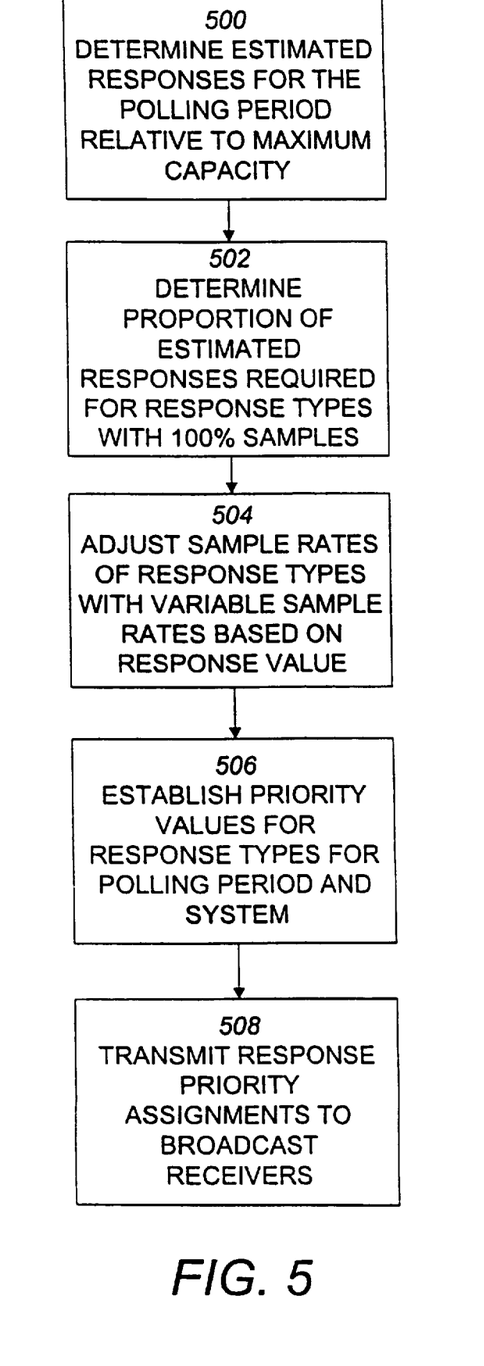
FIG. 5 is a flowchart illustrating the steps for establishing response type priority assignments.

FIG. 5 illustrates a flowchart of the process for configuring the BRs 120 in light of these factors. In one embodiment this process is managed by the broadcast server 110 for a number of LDCs 122, since it maintains the interactive applications which are broadcast to the BRs 120. In a preferred embodiment, the process is performed once during each polling period 400 since the particular expected responses in each polling period 400 vary. In an alternate embodiment, the process may be performed on a schedule independent of the polling period.

The broadcast server 110 estimates 500 the expected total number $E_{total}$ of responses to be generated during the polling period 400, and the expected total data of such responses. During a given time slot t, the expected number $E_{t,ch}$ of responses generated by an interactive application 115 on a specific channel ch is:

$$E_{t,ch} = N_{BR} * PS * AS * S * R \qquad (1)$$

where:

$N_{BR}$ is the number of BRs 120 in the interactive broadcast system;

PS is the program share 408 for the program on the channel ch during the time slot t;

AS is the application share 412 for the interactive application 115;

S is the required sample rate 414 for the interactive application 115; and R is the estimated response rate 416 for the interactive application 115.

For example, if there are 100,000 BRs 120 in the system, the Shopping Channel in FIG. 4 is expected to generate 18,490 responses during the 6 a.m. time slot.

Estimating the total number of responses $E_{total}$ generated during the entire polling period is done by summing the estimated number $E_{t,ch}$ of responses for all channels during all time slots during the polling period:

$$E_{total} = \sum_{t=1}^{slots} \sum_{ch=1}^{channels} E_{t,ch} \quad (2)$$

The total estimated responses $E_{total}$ is further used to estimate the total amount of data to be collected after the polling period by multiplying $E_{total}$ by the average response size.

Because the estimated total responses is only an estimate, it is desirable to increase the estimate by a certain buffer amount so as to ensure that the actual number of responses is less than the total capacity of the system.

From (1) and (2) it can be seen that modification of the required sample rate 414 for each of the interactive applications enables the system operator to control the total number of responses in a polling period. In making the initial assignment of sample rates 414 for all of the interactive applications, the broadcast server 110 can use default rates or rates requested by the providers of the interactive applications. In doing so, the broadcast server 110 initially assigns a 100% sample rate to any interactive application 115 that has a response type 410 of a purchase response or a registration response, since these two are preferred response types that should always be collected. In other embodiments, different response types may be preferred and given a 100% sample rate.

From the estimated total $E_{total}$, the broadcast server 110 determines 502 the proportion $E_R$ the estimated total responses that require a 100% sample rate 414. This proportion will generally include responses from interactive applications that generate purchase and registration responses, as just described, or any other interactive application 115 for which its provider requires such a sample rate. With this proportion $E_R$ known, the proportion $E_V$ which has a variable sample rate 414 is also known, $E_V = (E_{total} - E_R)$.

The broadcast server 110 next adjusts 504 the sample rates 414 for the interactive applications that have a variable sample rate 414. This adjustment either increases or lowers the sample rate as needed to move the overall number of responses to an amount less than the total capacity of the system. The total capacity for each LDC's 122 local system is determined from the bandwidth of the particular network coupling a group of BRs 120 to the LDC 122, times the duration of the polling window during which polling is conducted by that LDC 122. This local system capacity is then summed over all of the LDCs 122 for which the broadcast server 110 is managing this process. This summed value is the total system capacity. More specifically:

$$C = \sum_{i=1}^{\#LDCs} B_i W_i \quad (3)$$

where:

C is the total capacity for all LDCs 122;

B is the bandwidth of an individual LDC's 122 network to its BRs 120; and W is the duration of the polling window used an individual LDC 120.

The adjustment is preferably based on the economic value of the responses to the provider for its interactive application 115. In other words, providers who are willing to pay more for collecting a larger sample of responses, or more valuable responses, to their applications can have the sample rate 414 for their interactive applications increased, so long as there is available capacity as determined by the broadcast server 110.

Once the sample rate 414 for each interactive application 115 is established, the broadcast server 110 establishes 506 a priority value for each of the various response types 410. This priority value is in effect until it is modified again by the broadcast server 110, and will preferably last at least an entire polling period 400. In a preferred embodiment, the response priority values for response types that have 100% sample rates are always higher than the response priority values for responses types that have variable (<100%) sample rates. In this manner, responses of the former type always have priority over responses of the latter type.

In one embodiment, this set of priority values is stored in a priority table. For purposes of convenience, a default set of priority values for response types may be defined, and then modified. In a preferred embodiment, the default priority values are:

TABLE 1

Priority Values for Responses

| Response Type | Priority Value |
| --- | --- |
| Registration | 5 |
| Purchase | 4 |
| Request | 3 |
| Vote | 2 |
| Usage | 1 |

It should remembered that these default priority values are likely to be modified as a result of the specific adjustment of priority values as described above.

In another embodiment, the priority value assignments may be made directly a function of the economic value of the response to the LDC 122 or the broadcast server 110, without being based on an assigned sample rate 414. Thus, even interactive applications that have variable sample rates 414 can have very high (even the highest) priority values for their responses. Alternatively, the response priority values may be based on the size of the responses, so that smaller responses are preferred over larger ones having the same economic value.

The broadcast server 110 then transmits 508 the priority value assignments, for example in the form of the priority table, to each of the BRs 120 in the system. Each BR 120 stores the priority values in the first storage device 212 or other memory. The assignments may be encoded in a special interactive application 115 that is automatically executed by each BR 120 to store the priority value assignments in the first storage device 212. These assignments are then used by each BR 120 to selectively control which responses to interactive applications it stores.

The above described process of determining the priority value assignments may also be managed by individual LDCs 122 with respect to their own network requirements, and the particular characteristics of their installed base of BRs 120. This embodiment is desirable where there are multiple LDCs 122 with differing response capacities, such that management by a single broadcast server 110 is not optimal.

In some instances is may be desirable for the priority assignments to be changed in the midst of a polling period, or even for a single interactive application 115. For these cases, an interactive application 115 may include its own priority value assignment table that is substituted, either temporarily while the interactive application 115 is executing, or for the rest of the polling period, for any previous such table received and stored in the BR 120. Alternatively, an interactive application may simply update a stored priority table with its own priority value. The BR 120 will use the substitute priority values to make the priority determination (discussed below) for the current interactive application in this case. This embodiment allows for real time adjustment of the priority values at any point during the polling period.

For example, assume a novelty product vendor is only willing to pay the LDC 122 $2 for each purchase response that is generated to purchase an advertised novelty product, and a luxury car manufacturer is willing to pay $10 for each request response requesting information about its luxury cars. An interactive application for the luxury car manufacturer can then set the priority value for its request responses higher than the priority value for purchase responses.

Figure 6:
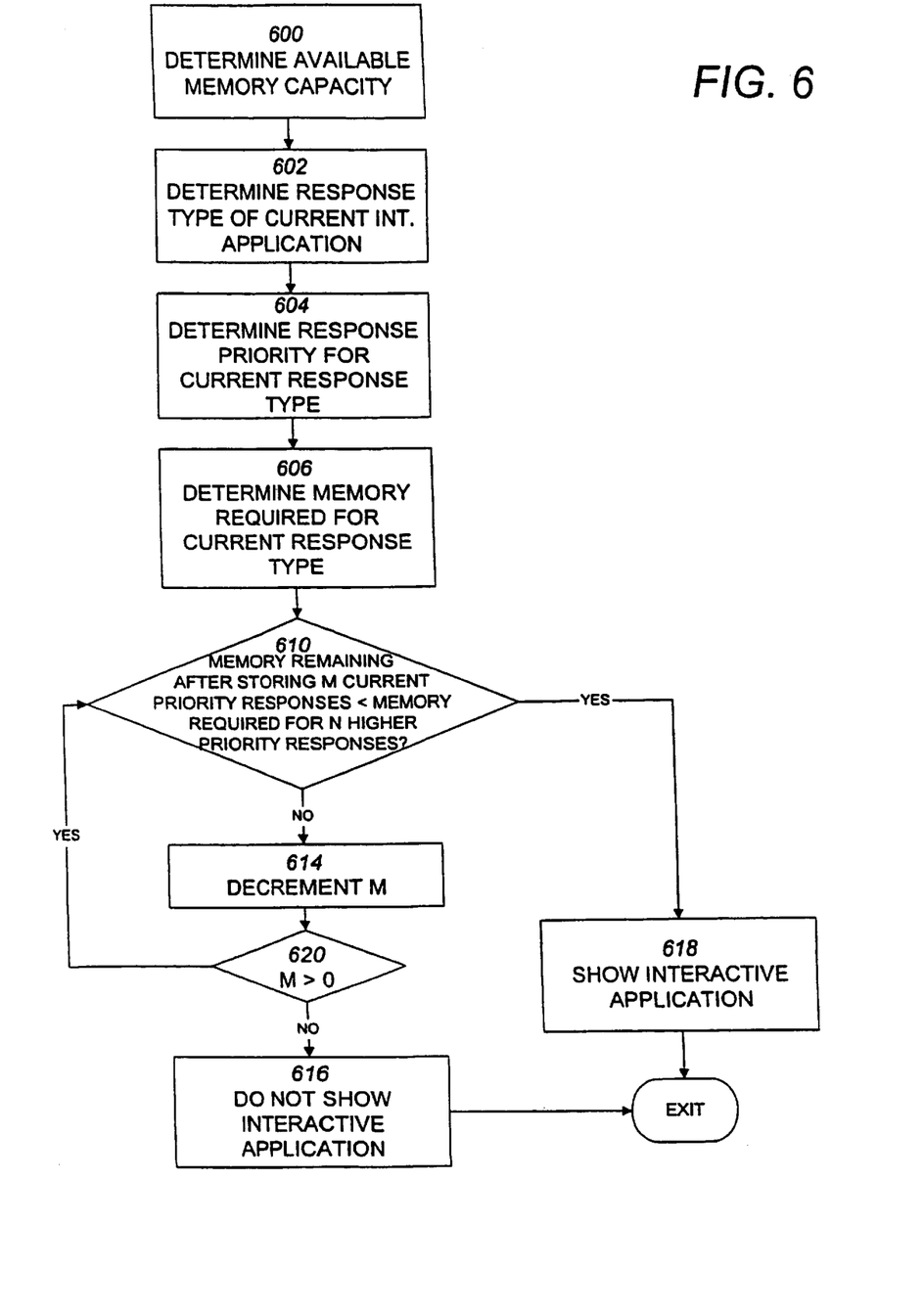
FIG. 6 is a flowchart illustrating the operation of a broadcast receiver in managing the storing of responses.

Referring to FIG. 6, there is shown a flowchart of the operation of an individual BR 120 to determine whether to collect responses to an individual interactive application 115. The method shown in FIG. 6 is executed by a BR 120 each time it detects a channel change to a different channel, and there is an interactive application 115 being broadcast on that channel.

The BR 120 determines 600 the available memory for storing responses. This will be based on the number and amount of response previously stored, if any.

The BR 120 also determines 602 the response type 410 for the interactive application 115 that is broadcast on the current channel. This is the current response type. This information is preferably encoded in the application header of the interactive application 115.

Using this response type, the BR 120 determines 604 the priority value that has been assigned to that response type. This is the current priority value. The BR 120 further determines 606 the memory required to store a response of the current response type.

Using the gathered data, the BR 120 determines 610 whether the amount of memory remaining after storing M responses of the current priority is less than the memory required to store N responses of higher priority. In a simple embodiment, M and N are set to 1, so that the determination 610 is merely whether both a current and higher priority response could be stored in the available memory. If there would be sufficient memory to store both a response of the current priority and a number of higher priority responses, then the BR 120 displays 618 the interactive application 115 and allows it to generate and receive viewer responses.

In a more complex embodiment, M and N are both set greater than 1. For example, a desired number of responses for each response type may be established along with the priority assignments. M become the desired number for the current response type, and N the maximum of the desired number of responses for higher priority responses.

If, however, there is insufficient memory to allow the storage of both current and higher priority responses, then the BR 120 decrements 614 M for the number of current responses, and tests 620 whether M allows at least one response to be collected at the current priority level. If M is 0, then the interactive application 115 is not shown 616 since there is insufficient memory to store a single response of the current priority and at least one higher priority response.

If the allowed number M of responses is more than 0, then the BR 120 again tests 610 whether sufficient memory remains when collecting the revised number responses. If after zero or more iterations where the number of collected current responses remains 1 or more and there is also sufficient memory, then the interactive application 115 is displayed 618 and enabled for storing the 1 or more responses. Otherwise, if there remains insufficient memory, then the application is not shown 616 or enabled to collect responses. In this fashion, the BR 120 ensures that only responses of sufficient priority are collected during the polling period. Since the priority values are established to reflect the sample rate for the responses, the broadcast server 110 can control the overall responses collected.

In summary, since the reconfiguration of the BRs 120 preferably occurs each polling period, the broadcast server 110 is able to selectively control and manage the response capacity of the network and LDC 122 to optimize the amount of responses it collects during each polling period.

We claim:

1. A computer-implemented method of configuring a broadcast receiver to preferentially store various types of data, the method comprising:

receiving an interactive application configured to receive a predetermined type of response;

determining a response priority value for the predetermined type of response;

determining whether there is sufficient available memory capacity in the broadcast receiver to receive a response to the received interactive application and at least one response having a response type with a priority value higher than the response priority value of the predetermined type of response; and responsive to there being sufficient memory, permitting the interactive application to be executed by the broadcast receiver to receive a response, and storing any received response in the memory.

2. The method of claim 1, further comprising:

periodically receiving from a remote source at least one response priority, each response priority defining a priority value for a type of response data, and storing the response priorities in a local memory of the broadcast receiver; and wherein determining whether there is sufficient available memory capacity in the broadcast receiver further comprises:

determining from the response priorities the priority value for the response type of the received interactive application.

3. The method of claim 2, wherein the period for receiving is a polling period for the broadcast receiver to be polled to obtain stored responses.

4. The method of claim 1, wherein the priority value of each response type is a function of an economic value of the response type to a provider of an interactive application configured to receive a response of that type.

5. The method of claim 1, further comprising:

periodically receiving from a remote source a sampling rate for a specified type of response; and wherein determining whether there is sufficient available memory capacity in the broadcast receiver further comprises:

determining from the sampling rate whether there is sufficient memory to store responses of the specified type.

6. The method of claim 1, wherein the predetermined type of response is selected from a group consisting of:
   a registration response;
   a purchase response;
   a request response;
   a vote response; and
   a usage response.

7. The method of claim 6, wherein a registration response includes information for identifying the viewer, product or service being registered.

8. The method of claim 6, wherein a purchase response includes data identifying a product or service being purchased, purchaser identifying data, and payment information.

9. The method of claim 6, wherein a request response includes data identifying a product or service about which information is desired, and data for identifying the viewer to allow the information to be provided to the viewer.

10. The method of claim 6, wherein a vote response comprises a viewer response to a participatory interactive application.

11. The method of claim 6, wherein a usage response includes information about a viewer's use of at least one of the broadcast receiver or other devices coupled to the broadcast receiver.

12. A method of configuring a plurality of broadcast receivers to preferentially store various types of data, the method comprising:
   estimating a number of responses to be collected from the plurality of broadcast receivers during a selected polling period, wherein each response has a response type;
   determining a first proportion of the estimated number of responses that must be collected according to their response type;
   determining a second proportion of the estimated number of responses that may be sampled according to their response type;
   establishing for each response type in the first proportion a first response priority value;
   establishing for each response type in the second proportion a second response priority value, wherein any first response priority value is equal to or higher than any second response priority value;
   establishing at least one sampling rate for response types included in the second proportion of responses; and
   transmitting the response priority values for the response types to the broadcast receivers for storage therein.

13. The method of claim 12, wherein all steps are repeated in each of a plurality of different polling periods.

14. The method of claim 12, wherein the priority value of each response type is a function of an economic value of the response type to a provider of an interactive application configured to receive a response of that type.

15. The method of claim 12, wherein each interactive application is associated with a broadcast program broadcast on a selected channel during a selected time period, and wherein estimating the number of responses to be collected during a selected polling period further comprises:
   for each time period during the polling period and for each channel on which programs are broadcast during the polling period, estimating a number of responses generated by an interactive application on the channel during the time period.

16. The method of claim 12 wherein the polling period includes a number of time periods and the broadcast receivers receive responses from interactive applications, each interactive application associated with a program broadcast on a channel during at least one time period.

17. The method of claim 16 wherein estimating a number of responses further comprises:
   for each time period and for each interactive application that might be executed during the time period, estimating a number of responses generated by the interactive application during the time period.

18. The method of claim 17 wherein the estimated number of responses is a function of a number of broadcast receivers that may be communicated with, a program share for the program on the channel during the time period, an application share for the interactive application, a required sample rate for the interactive application, and an estimated response rate for the interactive application.

19. The method of claim 12, wherein the estimated number of responses is determined according to the following equation:

$$E_{total} = \sum_{t=1}^{periods} \sum_{ch=1}^{channels} E_{t,ch}$$

where $E_{total}$ is the number of responses generated during the entire polling period;
periods is the number of time periods in the polling period;
channels is a number of channels; and
$E_{t,ch}$ is an expected number of responses generated by an interactive application on a specific channel ch during a given time period t.

20. The method of claim 12, wherein estimating the total number of responses to be collected during a selected polling period further comprises:
   for each of a plurality of interactive applications that may be executed during the polling period, estimating a number of responses to the interactive applications.

21. The method of claim 20, wherein estimating a number of responses generated by an interactive application on a specific channel during a specific time period further comprises:
   determining the total number of broadcast receivers that can be communicated with;
   determining the program share for each program in the time period;
   determining the application share for the interactive application;
   estimating the response rate for the interactive application;
   determining the required sample rate for the interactive application; and
   multiplying the preceding five factors together.

22. The method of claim 21, wherein estimating the total number of responses generated during an entire polling period further comprises:
   totaling the estimated number of responses for all channels during all time slots during the polling period.

23. The method of claim 12, wherein estimating the total number of responses generated during the entire polling period further comprises increasing the estimate by a buffer amount so as to ensure that the actual number of responses is less than a maximum number of responses that may be received.

24. A broadcast receiver for preferentially storing response data, comprising:

a processor that executes an interactive application configured to receive a user input response of a predetermined type;

a memory coupled to the processor, and for storing:
an interactive application; and
a response generated by the interactive application being executed by the processor; and
a response manager executed by the processor and responsive to the broadcast receiver receiving an interactive application, determining whether there is sufficient available memory available to receive a response to the received interactive application and at least one response having a response type with a priority value higher than the response priority value of the predetermined type of response for the received interactive application, and responsive to there being sufficient memory, permitting the interactive application to be executed by the processor to receive a response.

25. A computer program product stored on a computer readable medium for configuring a plurality of broadcast receivers to preferentially store various types of data, the computer program product controlling a processor coupled to the medium to perform the operations of:

estimating a number of responses to be collected from the plurality of broadcast receivers during a selected polling period, wherein each response has a response type;

determining a first proportion of the estimated number of responses that must be collected according to their response type;

determining a second proportion of the estimated number of responses that may be sampled according to their response type;

establishing for each response type in the first proportion a first response priority value;

establishing for each response type in the second proportion a second response priority value, wherein any first response priority value is equal to or higher than any second response priority value;

establishing at least one sampling rate for response types included in the second proportion of responses; and transmitting the response priority values for the response types to the broadcast receivers for storage therein.

26. The computer program product of claim 25, wherein the computer program product causes the processor to repeat all the operations in each of a plurality of different polling periods.

27. The computer program product of claim 25, wherein the priority value of each response type is a function of an economic value of the response type to a provider of an interactive application configured to receive a response of that type.

28. The computer program product of claim 25, wherein each interactive application is associated with a broadcast program broadcast on a selected channel during a selected time period, and wherein estimating the number of responses to be collected during a selected polling period further comprises:

for each time period during the polling period and for each channel on which programs are broadcast during the polling period, estimating a number of responses generated by an interactive application on the channel during the time period.

29. The computer program product of claim 25, wherein the polling period includes a number of time periods and the broadcast receivers receive responses from interactive applications, each interactive application associated with a program broadcast on a channel during at least one time period.

30. The computer program product of claim 29, wherein estimating a number of responses further comprises:

for each time period and for each interactive application that might be executed during the time period, estimating a number of responses generated by the interactive application during the time period.

31. The computer program product of claim 30, wherein the estimated number of responses is a function of:

a number of broadcast receivers that may be communicated with;

a program share for the program on the channel during the time period;

an application share for the interactive application;

a required sample rate for the interactive application; and an estimated response rate for the interactive application.

32. The computer program product of claim 25, wherein the estimated number of responses is determined according to the following equation:

$$E_{total} = \sum_{t=1}^{periods} \sum_{ch=1}^{channels} E_{t,ch}$$

where $E_{total}$ is the number of responses generated during the entire polling period;

periods is the number of time periods in the polling period;

channels is a number of channels; and $E_{t,ch}$ is an expected number of responses generated by an interactive application on a specific channel ch during a given time period t.

33. The computer program product of claim 25, wherein estimating the total number of responses to be collected during a selected polling period further comprises:

for each of a plurality of interactive applications that may be executed during the polling period, estimating a number of responses to the interactive applications.

34. The computer program product of claim 33, wherein estimating a number of responses generated by an interactive application on a specific channel during a specific time period further comprises:

determining the total number of broadcast receivers that can be communicated with;

determining the program share for each program in the time period;

determining the application share for the interactive application;

estimating the response rate for the interactive application;

determining the required sample rate for the interactive application; and multiplying the preceding five factors together.

35. The computer program product of claim 34, wherein estimating the total number of responses generated during an entire polling period further comprises:

totaling the estimated number of responses for all channels during all time slots during the polling period.

36. The computer program product of claim 25, wherein estimating the total number of responses generated during the entire polling period further comprises:

increasing the estimate by a buffer amount so as to ensure that the actual number of responses is less than a maximum number of responses that may be received.

37. A method of configuring a plurality of broadcast receivers to preferentially store various types of data, the method comprising:

estimating a number of responses to be collected from the plurality of broadcast receivers during a selected polling period, wherein each response has a response type;

determining a first proportion of the estimated number of responses that must be collected according to their response type;

determining a second proportion of the estimated number of responses that may be sampled according to their response type;

establishing for each response type in the first proportion a first sampling rate;

establishing for each response type in the second proportion a second sampling rate, wherein the first sampling rate is equal to or higher than each second sampling rate; and transmitting the sampling rates for the response types to the broadcast receivers for storage therein.

38. The method of claim 37, wherein all steps are repeated in each of a plurality of different polling periods.

39. The method of claim 37, wherein the sampling rate of each response type is a function of an economic value of the response type to a provider of an interactive application configured to receive a response of that type.

40. A broadcast receiving system configured to preferentially store various types of data, the system comprising:

a receiving means for receiving an interactive application configured to receive a predetermined type of response;

a first determining means coupled to the receiving means for determining a response priority value for the predetermined type of response;

a second determining means coupled to the first determining means for determining whether there is sufficient available memory capacity in the broadcast receiver to receive a response to the received interactive application and at least one response having a response type with a priority value equal to or higher than the response priority value of the predetermined type of response; and an executing means coupled to the receiving means to receive the interactive application, and coupled to the second determining means for executing the interactive application in response to the second determining means determining that there is sufficient memory, and for receiving a response and storing the response in the memory.

41. A system for preferentially storing various types of data in a plurality of broadcast receivers, the system comprising:

an estimating means for estimating a number of responses to be collected from the plurality broadcast receivers during a selected polling period, wherein each response has a response type;

a first determining means coupled to the estimating means for determining a first proportion of the estimated number of responses that must be collected according to their response type;

a second determining means coupled to the estimating means for determining a second proportion of the estimated number of responses that may be sampled according to their response type;

a first establishing means coupled to the first determining means for establishing for each response type in the first proportion a first response priority value;

a second establishing means coupled to the second determining means for establishing for each response type in the second proportion a second response priority value, wherein any first response priority value is higher than any second response priority value;

a third establishing means coupled to the second determining means for establishing at least one sampling rate for response types included in the second proportion of responses; and a transmitting means coupled to the first and second establishing means for transmitting the response priority values for the response types to the broadcast receivers for storage therein.

42. A computer-implemented method of configuring a broadcast receiver to preferentially store various types of data, the method comprising:

receiving an interactive application configured to receive a predetermined type of response;

determining a response priority value for the predetermined type of response;

responsive to the response priority value being a highest priority:
permitting the interactive application to be executed by the broadcast receiver to receive a response, and storing any received response in the memory; and responsive to the response priority value being less than the highest priority:
determining whether there is sufficient available memory capacity in the broadcast receiver to receive a response to the received interactive application and at least one response having a response type with a priority value higher than the response priority value of the predetermined type of response; and responsive to there being sufficient memory, permitting the interactive application to be executed by the broadcast receiver to receive a response, and storing any received response in the memory.

* * * * *